US012750332B2

(12) United States Patent
Agrawal et al.

(10) Patent No.: US 12,750,332 B2
(45) Date of Patent: Sep. 29, 2026

(54) TECHNIQUES FOR A SELF-LEARNING SCALABLE EVENT BROKER

(71) Applicants: Oracle International Corporation, Redwood Shores, CA (US); Indian Institute of Technology Roorkee, Roorkee (IN)

(72) Inventors: Manish Kumar Agrawal, Bangalore (IN); Sandeep Kumar, Roorkee (IN); Yogesh Kumar, Saratoga, CA (US)

(73) Assignees: Oracle International Corporation, Redwood Shores, CA (US); Indian Institute of Technology Roorkee, Roorkee (IN)

( * ) Notice: Subject to any disclaimer, the term of this patent is extended or adjusted under 35 U.S.C. 154(b) by 211 days.

(21) Appl. No.: 18/750,340

(22) Filed: Jun. 21, 2024

(65) Prior Publication Data

US 2025/0350573 A1 Nov. 13, 2025

(30) Foreign Application Priority Data

May 7, 2024 (IN) ............................ 202441036239

(51) Int. Cl.
*H04L 51/224* (2022.01)
*H04W 8/18* (2009.01)

(52) U.S. Cl.
CPC ............ *H04L 51/224* (2022.05); *H04W 8/18* (2013.01)

(58) Field of Classification Search
CPC ............................... H04L 51/224; H04W 8/18
USPC ...................................................... 455/412.1
See application file for complete search history.

(56) References Cited

U.S. PATENT DOCUMENTS

| | | | | |
|---|---|---|---|---|
| 8,028,085 | B2 | 9/2011 | Elien et al. | |
| 8,219,447 | B1 * | 7/2012 | Leong ................ | G06Q 30/0244 705/14.43 |
| 8,392,555 | B2 | 3/2013 | Gale et al. | |
| 2011/0258056 | A1 * | 10/2011 | Loffe ................ | G06Q 30/0277 715/234 |
| 2014/0195622 | A1 | 7/2014 | Cullen | |
| 2017/0098236 | A1 * | 4/2017 | Lee ...................... | G06Q 10/067 |
| 2018/0308030 | A1 * | 10/2018 | Nemati ............ | G06Q 10/06314 |

(Continued)

OTHER PUBLICATIONS

Architectural Overview of Pub/Sub, Available Online at: https://cloud.google.com/pubsub/architecture, Accessed from Internet on Oct. 20, 2023, pp. 1-10.

(Continued)

*Primary Examiner* — Michael R Neff
(74) *Attorney, Agent, or Firm* — Kilpatrick Townsend & Stockton LLP

(57) ABSTRACT

Techniques are disclosed for implementing a self-learning cloud-based message broker. The message broker can receive an event trigger that includes information usable to identify a subscribing client of a publisher-subscriber messaging system. The message broker can determine message parameters for one or more messages by sampling a distribution. The message broker can determine the message parameters in response to receiving the event trigger. The message broker can send the one or more messages to the subscribing client. The one or more messages can be characterized by the message parameters. The message broker can receive a response status from the subscribing client and, based on the response status, update the distribution.

20 Claims, 11 Drawing Sheets

(56) References Cited

U.S. PATENT DOCUMENTS

| | | | | |
|---|---|---|---|---|
| 2018/0308039 | A1* | 10/2018 | Nemati | G06Q 30/0202 |
| 2022/0187841 | A1* | 6/2022 | Ebrahimi Afrouzi | G05D 1/0272 |
| 2026/0004101 | A1* | 1/2026 | Zhang | G06N 3/004 |

OTHER PUBLICATIONS

Choose Pub/Sub or Pub/Sub Lite, Available Online at: https://cloud.google.com/pubsub/docs/choosing-pubsub-or-lite, Accessed from Internet on Oct. 20, 2023, pp. 1-6.

Compress Messages, Available Online at: https://cloud.google.com/pubsub/docs/compress-messages, Accessed from Internet on Oct. 20, 2023, pp. 1-3.

Handle Transient Spikes with Flow Control, Available Online at: https://cloud.google.com/pubsub/docs/flow-control, Accessed from Internet on Oct. 20, 2023, pp. 1-3.

How Uber Optimizes the Timing of Push Notifications using ML and Linear Programming, Available Online at: https://www.uber.com/en-IN/blog/how-uber-optimizes-push-notifications-using-ml/, Nov. 3, 2022, pp. 1-16.

Hoffert et al., Using Machine Learning to Maintain Pub/Sub System QoS in Dynamic Environments, Proceedings of the 8th International Workshop on Adaptive and Reflective Middleware, Dec. 2009, 6 pages.

Kang et al., DMSConfig: Automated Configuration Tuning for Distributed IoT Message Systems Using Deep Reinforcement Learning, Available Online at: https://arxiv.org/abs/2302.09146, Feb. 17, 2023, 13 pages.

Salinger et al., Optimizing Kafka Performance, Available Online at: https://granulate.io/blog/optimizing-kafka-performance/, Accessed from Internet on Oct. 20, 2023, pp. 1-9.

Shi et al., Using Machine Learning to Provide Reliable Differentiated Services for IoT in SDN-Like Publish/Subscribe Middleware, Sensors, vol. 19, No. 6, Mar. 25, 2019, pp. 1-25.

* cited by examiner

300

$$
\begin{bmatrix}
R[a_1, a_1] & \cdots & R[a_1, a_t] & & R[a_1, a_1^{(p)}] & \cdots & R[a_1, a_t^{(p)}] \\
\vdots & \ddots & \vdots & \cdots & \vdots & \ddots & \vdots \\
R[a_s, a_t] & \cdots & R[a_s, a_t] & & R[a_s, a_t^{(p)}] & \cdots & R[a_s, a_t^{(p)}] \\
 & \vdots & & \ddots & & \vdots & \\
R[a_1^{(b)}, a_1] & \cdots & R[a_1^{(b)}, a_t] & & R[a_1^{(b)}, a_1^{(p)}] & \cdots & R[a_1^{(b)}, a_t^{(p)}] \\
\vdots & \ddots & \vdots & \cdots & \vdots & \ddots & \vdots \\
R[a_s^{(b)}, a_t] & \cdots & R[a_s^{(b)}, a_t] & & R[a_s^{(b)}, a_t^{(p)}] & \cdots & R[a_s^{(b)}, a_t^{(p)}]
\end{bmatrix}
$$

*FIG. 3*

TECHNIQUES FOR A SELF-LEARNING SCALABLE EVENT BROKER

CROSS-REFERENCE TO RELATED APPLICATION

This application claims priority to and the benefit of Indian Patent Application number 202441036239, filed on May 7, 2024, and entitled "TECHNIQUES FOR A SELF-LEARNING SCALABLE EVENT BROKER," the entire contents of which are incorporated herein by reference in their entirety for all purposes.

BACKGROUND

Networked computing systems often make use of the publisher-subscriber ("Pub-Sub") messaging paradigm for asynchronous communication. In the Pub-Sub paradigm, information can be transmitted from publishing clients to subscribing clients as messages based on various triggering conditions. The Pub-Sub paradigm can allow for rapid dissemination of information in a variety of contexts. However, the asynchronous nature of the Pub-Sub paradigm can result in network traffic inefficiencies, including reduced latencies and traffic bottlenecks in the networked computing systems.

BRIEF SUMMARY

Embodiments of the present disclosure relate to a self-learning cloud-based broker for implementing improvements to the conventional Pub-Sub messaging paradigm for networked computing systems. In particular, distributed computing systems including cloud computing environments in which a large number (e.g., tens of thousands) of subscribing clients may receive messages from publishing clients can implement a self-learning cloud broker to improve the transmission of information (e.g., messages) from the publishing clients to the subscribing clients. The self-learning cloud broker can be configured to predict parameters (e.g., optimal parameters) for messages sent to subscribing clients so that the messages are successfully received by the subscribing clients. Within a distributed computing system, the selection of suitable parameters allows the self-learning cloud broker both to scale as the number of both subscribing clients and publishing clients increases (e.g., as additional client programs, applications, and/or devices are added to the distributed computing system) and to reduce latency, duplication, and network traffic to successfully deliver the messages.

One embodiment is directed to a method that can be performed by a message broker executing in a computing environment, including a distributed computing system. The message broker can receive an event trigger that includes information usable to identify a subscribing client of a publisher-subscriber messaging system. The event trigger can be a message published by a publishing client of the publisher-subscriber messaging system. The information can include a topic or other keyword that can associate the subscribing clients with the event trigger. The method can also include determining message parameters for one or more messages by sampling a distribution. The message broker can determine the message parameters in response to receiving the event trigger. The distribution can characterize a predicted response status of the subscribing client to the message. The method can also include the message broker sending the one or more messages to the subscribing client.

The one or more messages can be characterized by the message parameters. The message broker can also receive a response status from the subscribing client and, based on the response status, update the distribution.

Another embodiment is directed to a distributed computing system comprising one or more processors and one or more memories storing instructions that, when executed by the one or more processors, cause the computing device to perform the method(s) disclosed herein.

Still another embodiment is directed to a computer-readable medium storing computer-executable instructions that, when executed by one or more processors of a computing device, cause the computing device to perform the method(s) disclosed herein.

BRIEF DESCRIPTION OF DRAWINGS

FIG. 3 is an example array encoding reward values characterizing a distribution that can be sampled to determine a predicted success probability for a self-learning cloud broker to deliver one or more messages to a subscribing client, according to some embodiments.

DETAILED DESCRIPTION

Figure 1:
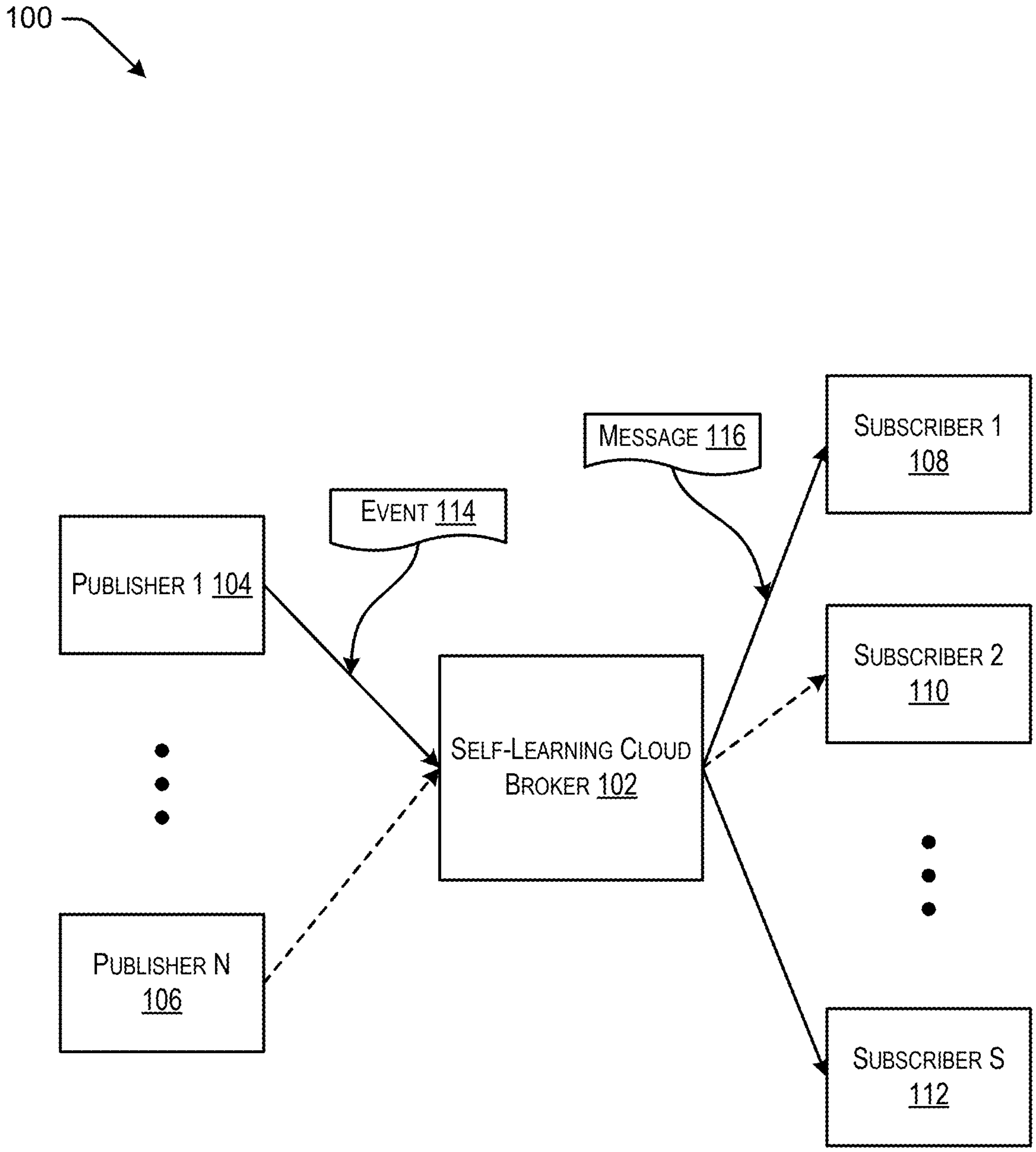
FIG. 1 is a block diagram depicting an example computing environment with a self-learning cloud broker implementing a Pub-Sub messaging system, according to some embodiments.

The present disclosure describes techniques for a self-learning cloud-based broker operating to mediate the delivery of messages within a publisher-subscriber (Pub-Sub) messaging system. The self-learning cloud broker can operate to mediate the delivery of messages from publishing clients to subscribing clients (also referred to as "publishers" and "subscribers" of the Pub-Sub messaging system, respectively). In a Pub-Sub messaging system, publishers can send messages on any topic, and subscribers can subscribe to the various topics to indicate that the subscriber should receive messages associated with that topic, so that the communication of information from the publisher to the subscriber occurs asynchronously. The creation of the message can be referred to as an event. Events can include, as non-limiting examples, an update to a monitored resource, a change in a stock price, the posting of new material to a social media site, a change to deployed infrastructure resource in a cloud computing environment, and the like. Publishers can send event information as messages to subscribers who have previously indicated that they should receive messages related to the event (that is to say, subscribers who have "subscribed" to events based on a topic, keyword, or other identifying information of the event). A broker system can act as an intermediary and collect the published messages. However, conventional broker systems may be insufficient to handle the scale of state of the art distributed computing systems and other cloud-based computing environments in which the number of publishers and subscribers can be enormous and can rapidly change as clients scale-up deployed computing resources to support processes, applications, and other software components that can act as both publishers and subscribers.

Conventional Pub-Sub messaging systems can be divided into two operating paradigms based on how the broker interacts with the subscribers. In the "pull model," subscribers can initiate requests with the broker to receive messages generated by the publishers at a time suitable to the subscriber. In the "push model," the broker pushes messages to subscribers in response to receiving the event message from the publishers. When a publisher sends a message to one or more subscribers in a Pub-Sub messaging system using the pull model, the broker can determine which of the subscribers should receive the message by, for example, using event information like a topic to match with corresponding subscribers.

In a distributed computing system like a cloud computing environment, a Pub-Sub messaging system can include numerous publishers and subscribers spread across several computing devices, including both bare metal computing devices and virtual machines (VMs), as well as user devices (e.g., personal computing devices, tablets, smartphones, etc.) that can communicate over one or more networks, including public networks like the internet. The publishers and subscribers can include applications, processes, and other software components executing on various combinations of the computing devices within the distributed computing environment. For example, a cloud service provider may provide computing resources to support a cloud application for a customer executing within a customer-specific tenancy of the computing resources. This cloud application may publish messages to be delivered to subscribing user devices (e.g., to send application data to users of the cloud application via the users' smartphones), which can be connected to the cloud computing environment over the public Internet, as well as subscribing cloud computing resources (e.g., operations computing devices monitoring the application's use of deployed resources in the cloud computing environment), which can be connected to the cloud computing environment via "internal" network connections (e.g., data center network of the cloud service provider). The flexibility of a cloud computing environment can allow the number of computing resources to change rapidly to meet customer needs, which can cause the number of publishers and subscribers to also change rapidly. As the number of publishers and subscribers increases, the broker of a Pub-Sub messaging system in the cloud computing environment can be configured to deliver messages predictively to account for the increased scale of the clients accessing the Pub-Sub messaging system.

As discussed above, the publishers and subscribers in a cloud computing environment can be varied, having different networking configurations (e.g., high-capacity Ethernet connections, 4G/5G cellular network connections, home consumer WiFi network connections) and capacity to process network traffic (e.g., an application executing on a single VM with limited compute capacity, a bare metal server device hosting a resource monitoring process, etc.). Thus, delivering event data, including messages, from the publishers to the subscribers can be sensitive to the constraints of individual subscribers. Low-frequency event delivery may be preferable for devices with limited resources or batteries, whereas high-frequency event delivery may be appropriate for robust devices with strong network connections. For example, a broker sending event data at a high rate (e.g., several large messages in a batch with short time gaps between successive messages) to one subscriber (e.g., a cloud-based digital assistant service) may be successful, while sending the event data at the same high rate to another subscriber (e.g., a cloud-based data integration service) may fail based on each subscriber's ability to successfully process the event data.

Because subscribers can include computing devices and/or computing systems with different configurations and capacity to handle incoming network traffic, the self-learning cloud broker described herein can be configured to predict optimal message parameters to ensure successful delivery of the messages to the subscribers. For example, the self-learning cloud broker can determine a batch count (e.g., the number of separate messages to send to a subscriber to completely deliver the published event information), a time gap (e.g., the amount of time between successive messages in a batch), and a payload size (e.g., the amount of data in each separate message in a batch) that is most likely to be successfully received by a particular subscriber to which the event information is to be delivered. Successful delivery can be determined based on whether the subscriber reports back a "success" acknowledgment of receipt of the message (or batch of messages) to the self-learning cloud broker within a threshold time period (e.g., 50 ms) or within a threshold number of retries (e.g., five retries). The self-learning cloud broker can track the successes and failures for each event delivery to each subscriber over time, thereby providing the ability to "learn" the capability of each individual subscriber to receive event data at the most suitable rate.

To determine the message parameters for each individual subscriber, the self-learning cloud broker can implement a version of Thompson sampling usable to address the multi-armed bandit model as applied to subscribing clients in a "push" model Pub-Sub messaging system. As in the multi-armed bandit model, each subscriber that is to receive event data as messages from the self-learning cloud broker can be represented as a Bernoulli bandit in which the messages are delivered either successfully (reward equal to 1) or unsuccessfully (reward equal to 0), with the probability of a successful delivery estimated by the mean of a distribution chosen to accurately represent Bayesian priors for each Bernoulli bandit. As described in more detail below with reference to the figures, the beta distribution characterized by a success count value and a failure count value for each subscriber/Bernoulli bandit is one exemplary choice for a suitable distribution (although those skilled in the art will recognize other suitable distributions). By sampling from the distribution for each subscriber and tracking the success and failures of message delivery to each subscriber, the self-learning cloud broker can both efficiently determine the message parameters that are most likely to result in successful message delivery to each subscriber and continuously update the distribution to adapt to changes in the capabilities (e.g., network capacity, latency, etc.) of each subscriber.

The techniques described herein can provide numerous advantages over conventional Pub-Sub messaging systems. For example, a self-learning cloud broker can adjust to changes in the number of both publishers and subscribers to robustly support scalability of the publishers and subscribers. As new subscribers are added to the computing environment (e.g., a cloud based application scales up with additional subscribing processes, devices, etc.), the self-learning cloud broker can rapidly determine optimal message parameters for the new subscribers even from pre-initialized parameters. After sending one or more messages to the new subscribers, the distribution can be updated to account for the success and/or failures of those sent messages, allowing the self-learning cloud broker to quickly converge to the optimal/most suitable message parameters. Moreover, if an existing subscriber is scaled to handle additional traffic (e.g., additional compute and network resources are deployed to scale-up a cloud application), the self-learning cloud broker can quickly update the distribution based on the responses from the scaled-up existing subscriber. In some instances, the self-learning cloud broker can receive indications about upcoming changes to either subscriber capabilities (e.g., a cloud application was recently scaled up with additional compute resources) or publisher volume (e.g., an upcoming holiday season will increase the volume of events to be delivered to subscribers) so that the self-learning cloud broker can modify the distribution in advance to anticipate the changes to the publishers and/or subscribers. In addition, techniques described herein minimize the amount of manual tuning or configuration of the self-learning cloud broker.

As another example, the self-learning cloud broker describe herein automatically accounts for differences in capabilities for each subscriber. For example, the successes and failures for message delivery are tracked for each subscriber, so that the distribution is updated according to those successes and failures. When sampling the distribution to determine suitable message parameters, the distribution will reflect the probability of success for delivering messages to each individual subscriber. In this manner, the self-learning cloud broker can deliver messages with optimal rate and/or minimal latency to both highly capable cloud application subscribers (e.g., devices with substantial network bandwidth and low latency network connections) as to network-limited devices (e.g., a remote user device with intermittent network connectivity. In addition, improved successful delivery of event messages can reduce the duplication of messages sent to subscribers (e.g., as retries), thereby substantially reducing the consumption of computing and network resources by the Pub-Sub messaging system within the cloud computing environment.

Turning now to the figures, FIG. 1 is a block diagram depicting an example computing environment 100 with a self-learning cloud broker 102 implementing a Pub-Sub messaging system, according to some embodiments. The computing environment 100 can be an example of a cloud computing environment or other distributed computing system (e.g., client/server system) in which multiple computing, networking, and storage devices operate in conjunction to create the computing environment 100. For example, various computing devices, including bare metal server device and VMs, can be configured to execute software (e.g., code, instructions, programs) on one or more processors of the computing devices or combinations thereof to implement the computing environment 100. In the context of a Pub-Sub messaging system, publishing clients ("publishers") and subscribing clients ("subscribers") can include applications, programs, processes, and the like executing on one or more of the computing device of the computing environment 100. For example, publisher 1 104 may be an example of a cloud based application executing on multiple VMs within the computing environment 100, while subscriber 2 110 may be an example of a user application executing at a user device (e.g., a smartphone) that can access cloud computing resources over a public internet.

The self-learning cloud broker 102 can be implemented on one or more computing devices within the computing environment 100. In some examples, the self-learning cloud broker 102 can be implemented within a cloud computing environment that operates within one or more data centers of a cloud service provider, in which each data center can include multiple bare metal server devices and associated networking and storage devices to enable to cloud computing environment. In these examples, the self-learning cloud broker 102 can be a cloud-based service and can communicate with other computing devices and/or software components via one or more network connections (e.g., internal data center network connections, private network connections, public network connections like the Internet, etc.). In other examples, the self-learning cloud broker 102 can execute on a single device, including a single server device or singe VM, as appropriate.

As depicted in in FIG. 1, the self-learning cloud broker 102 can be configured to mediate the delivery of messages (e.g., message 116) that include event data generated by publishers and intended to be delivered to one or more subscribers. For example, self-learning cloud broker 102 can mediate message delivery between N number of publishers including Publisher 1 104 through Publisher N 106 and S number of subscribers including Subscriber 1 108, Subscriber 2 110, and Subscriber S 112. The self-learning cloud broker 102 can maintain the subscription information for each of the S subscribers. For example, Subscriber 1 108 can subscribe to a topic corresponding to an uptime status change of a computing resource in the computing environment 100. Publisher 1 104 may be a process that monitors the computing resource and provides event information to the self-learning cloud broker 102 when the uptime of the computing resource changes (e.g., the computing resource goes offline). Then, in this example, Subscriber 1 108 can receive one or more messages including event information for the change in the uptime of the computing resource when that event information is published by Publisher 1 104. Subscribers can subscribe to one or more topics, and publishers can publish event information for one or more topics. The self-learning cloud broker 102 can maintain the subscription information in a database or other storage (not shown) accessible to the self-learning cloud broker 102. The self-learning cloud broker 102 can update the subscription information as the number of publishers and subscribers increases and/or decreases or as existing subscribers modify their existing subscriptions to topics.

Not all topics may be subscribed to by all S subscribers. For example, Publisher 1 104 can publish an event 114 to self-learning cloud broker 102. The event 114 can include information that determines to which subscribers the event information should be delivered as a message. For example, the event 114 can include the topic (e.g., as a keyword, tag, channel identifier, or other identifier). The self-learning cloud broker 102 can use the information to determine the subscribers to which the corresponding messages should be delivered. In the example, event 114 can include information indicating a topic to which Subscriber 1 108 and Subscriber S 112 are subscribed (indicated by the solid arrows), but to which Subscriber 2 110 is not subscribed (indicated by the dashed arrow). The self-learning cloud broker 102 can then send a message 116 to Subscriber 1 108 (and a corresponding message to Subscriber S 112, not shown), but no message may be sent to Subscriber 2 110. As described in more detail below with respect to FIG. 2, the message 116 sent to Subscriber 1 108 in response to event 114 may have parameters determined by self-learning cloud broker 102 by sampling a distribution for Subscriber 1 108.

Figure 2:
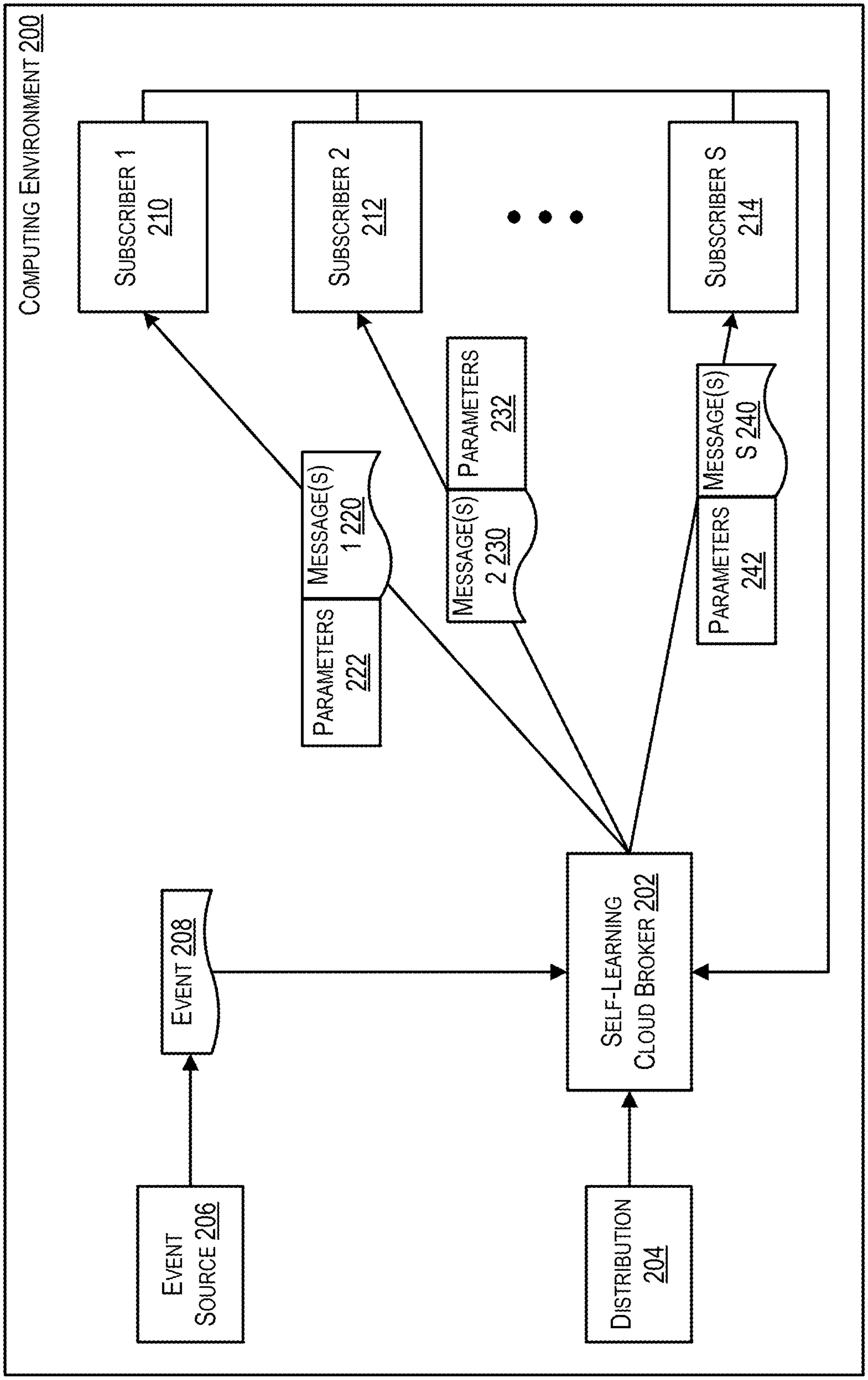
FIG. 2 is a block diagram illustrating an example architecture of a Pub-Sub messaging system including a self-learning cloud broker within a computing environment, according to some embodiments.

FIG. 2 is a block diagram illustrating an example architecture of a Pub-Sub messaging system including a self-learning cloud broker 202 within a computing environment 200, according to some embodiments. The computing environment 200 may be an example of computing environment 100 of FIG. 1, while self-learning cloud broker 202 may be an example of self-learning cloud broker 102 of FIG. 1.

In the Pub-Sub messaging system of FIG. 2, the self-learning cloud broker 202 can receive an event 208 from an event source 206. The event 208 can include event information, including a topic or other identifier usable to determine subscribers to which messages should be sent to transmit the event information. The event source 206 can be a publishing client of the Pub-Sub messaging system (e.g., Publisher 1 104 of FIG. 1). In response to receiving the event 208, the self-learning cloud broker 202 can identify which subscribers to send corresponding messages. For example, the self-learning cloud broker 202 can determine that each of Subscriber 1 210, Subscriber 2 212, and Subscriber S 214 should receive corresponding message(s) 1 220, message(s) 2 230, and message(s) 3 240, respectively. Each of the message(s) 220-240 can be characterized by corresponding parameters 222-242. For example, message(s) 1 220 can be characterized by parameters 222, message(s) 2 230 can be characterized by parameters 232, and message(s) 3 240 can be characterized by parameters 242.

To determine the parameters 222-242, the self-learning cloud broker 202 can sample a distribution representing the probability that the messages will be successfully delivered for each corresponding client. For example, for message(s) 1 220 sent to Subscriber 1 210 in response to event 208, the self-learning cloud broker 202 can determine parameters 222 that maximize the probability that the message(s) 1 220 will be successfully delivered to Subscriber 1 210. Depending on the parameters and the type and quantity of event information, the message(s) 1 220 (and messages sent to other subscribers) can include one or more separate messages encompassing a portion of the total event information. For example, the event information may be separated into data payloads of multiple messages, so that delivery of the event information occurs with the delivery of the multiple messages. An individual message may conform to one of several data architectures, including representational state transfer (REST) or remote procedure call (RPC), and may be formatted as an HTML, XML, JSON, or similar document. The message can include fields for data related to and/or describing the event information, including attributes, timestamp, identifiers, and a data payload.

The parameters for the message(s) sent in response to the event 208 can include a batch count, a payload size, and a time gap. The batch count can specify the number of messages to be sent in a "batch," a collection of individual messages sent successively by the self-learning cloud broker 202 to a subscriber (e.g., Subscriber 1 210). The collection of messages in the batch can include the event information from event 208 divided among the payloads of the messages. For example, parameters 222 can specify a batch count of 20 for message(s) 1 220, so that the event information from event 208 is delivered to Subscriber 1 210 as 20 messages. Batching the messages can improve network performance in cases where more, smaller messages are sent rather than fewer, larger messages (e.g., limited subscriber network bandwidth). The payload size can specify the amount of data (e.g., in bytes) allocated for the event information in each message. For example, each message may can have a payload size of 64 bytes, 256 bytes, or 1 megabyte, although many other values for payload size are suitable. As described above, the batch count can influence the payload size and vice versa; for a given quantity of event data, a larger batch count can result in a smaller payload size, while a smaller batch count can result in a larger payload size for each message. The time gap can specify the length of time between the delivery of successive event messages. For example, if message(s) 1 220 are sent in response to event 208, the parameters 222 can specify that the time gap between individual messages is 100 ms. In some examples, the time gap may be 10 ms, 200 ms, 1 s, 5 s, any intervening value, or any other suitable value determined by the self-learning cloud broker 202. In some examples, the time gap can specify the period of time between successive batches of messages.

The distribution 204 can be a distribution that represents the probability that a message (or batch of message(s)) will be successfully delivered for a set of parameters (e.g., parameters 222-242). In some embodiments, the distribution 204 may be the beta distribution Beta(α,β) having two input parameters α and β and characterized by the probability density function given as:

$$f(x;\alpha,\beta)=\frac{\Gamma(\alpha+\beta)}{\Gamma(\alpha)\Gamma(\beta)}x^{\alpha-1}(1-x)^{\beta-1}$$

where Γ is the Gamma function. The mean of the Beta distribution is simply $$\mu=\frac{\alpha}{\alpha+\beta}$$

and can represent the "reward" for the corresponding bandit. For Thompson sampling with Bernoulli bandits, the parameters α and β can represent the number of successes and failures, respectively, for prior messages sent to each subscriber (e.g., Subscriber 1 210, Subscriber 2 212, Subscriber S 214) for each specific value of the batch count, payload size, time gap, and any other parameters. The distribution 204 can then be represented as a stored array of success and failure counts indexed for each of S subscribers and each potential value of the parameters. For example, if the parameters include batch count, payload size, and time gap, then the distribution 204 can be stored as a five dimensional array indexed by the number of subscribers, the number of available time gap intervals, the number of available batch count values, the number of available payload size values, and the success/failure index. The available values for the parameters may be predetermined for the self-learning cloud broker 202. For example, available batch count values can increment by one from a minimum of one to a maximum batch count value (e.g., 10,000). Then, the available batch count values can be each integer between one and 10,000. Similarly, the available time gap values can increment by 100 ms from a minimum time gap value (e.g., 100 ms) to a maximum time gap value (e.g., 5,000 ms), so that each integer index corresponding to the time gap can represent a time gap value separated by 100 ms (e.g., t=1 corresponds to 100 ms time gap, t=2 corresponds to 200 ms time gap, etc.). An example of an array for the distribution 204 is shown in more detail below in FIG. 3.

With the distribution 204 stored as an array of reward values (e.g., success counts and failure counts), the self-learning cloud broker 202 can sample the distribution 204 by determining the indices corresponding to the maximum value of the computed distribution for the reward values with the minimal time gap between successive messages. For example, the self-learning cloud broker 202 can determine the values of the payload size and batch count corresponding to a maximum value of the Beta distribution while simultaneously determining the minimum time gap for those optimal payload size and batch count values. Expressed algorithmically, the optimal indices may be determined according to $$\text{optimalIndices}[s, t, p, b] = \underset{t}{\operatorname{argmin}}\left[\underset{p,b}{\operatorname{argmax}}[\text{Beta}(\alpha, \beta)]\right],$$

where "s" represents the index of a subscriber, "t" represents the index of a time gap, "p" represents the index of a payload size, and "b" represents the index of a batch count. As discussed above, α can represent the number of successes when delivering message(s) to subscriber s with time gap t, payload size p, and batch count b, while β can represent the number of failures when delivering message(s) to subscriber s with the same parameters. In some embodiments, rather than a discrete computation of parameter values, the parameter values can be solved using continuous values for the parameters.

In some embodiments, the distribution 204 can be initialized for use by the self-learning cloud broker 202. For example, prior to the first operation of the Pub-Sub messaging system using the self-learning cloud broker 202, the distribution can be initialized with each success count and failure count for each available value of the parameters set to "1," so that a priori the probability of a successful delivery of a message is 50% for every available combination of parameters. Then, as the self-learning cloud broker 202 receives events (e.g., event 208) and delivers message(s) to the subscribers, the self-learning cloud broker 202 can update the distribution based on the success and/or failure of delivering each message to the subscribers. In some examples, the self-learning cloud broker 202 can also have maximum parameter values initialized. For example, a maximum batch count, maximum payload size, and maximum time gap value can be set based on predetermined values. In addition, for embodiments in which the available values are discrete, an interval size for the parameters can be set. For example, the time gap interval can be initially set to 100 ms, while the payload size interval can be initially set to 64 bytes.

As the self-learning cloud broker 202 delivers message(s) to subscribers based on events (e.g., event 208), the subscribers can send a response 250 indicating the success and/or failure of the sent messages. For example, Subscriber S 214 can receive message(s) S 240 characterized by parameters 242. If Subscriber S 214 successfully receives the message(s) S 240, then Subscriber S can send response 250 to self-learning cloud broker 202 indicating the success. Whether the receipt of the messages is successful can be based on a threshold response time. For example, the self-learning cloud broker 202 can expect a response 250 from a subscriber within 250 ms of sending the messages. If the response 250 is not received within 250 ms, the message delivery can be considered a failure. In some embodiments, the threshold response time can be a fixed value for each subscriber. For example, the self-learning cloud broker 202 can expect responses from every subscriber within 250 ms. In other embodiments, the threshold response time can be set for each individual subscriber. In addition, the threshold response time can be based on a network communication latency determined for each individual subscriber. For example, Subscriber S 214 may be a remote computing device with a 300 ms latency between the self-learning cloud broker 202 and the Subscriber S 214. The threshold response time can then be set to a value greater than 300 ms (e.g., 750 ms) to account for the inherent latency in the network communication channel between the self-learning cloud broker 202 and the Subscriber S 214.

In some embodiments, the success and/or failure of the receipt of the messages can be based on the actual receipt of the message and/or the data quality of the received message. If the subscriber receives a message for which the data payload is missing, corrupted, or otherwise unreadable/unretrievable, the subscriber can send a response 250 indicating that the message was not successfully delivered (e.g., a failed delivery). In examples where the message(s) are sent in a batch, the successful delivery of the batch can be based on the receipt of each message in the batch. If the subscriber determines that one message in the batch was not successfully received when the other messages of the batch were successfully received, the subscriber can send the response 250 to the self-learning cloud broker 202 indicating that the batch was not successfully delivered (e.g., a failed delivery).

Based on the response 250 from the subscriber, the self-learning cloud broker 202 can update the distribution 204. If the response 250 indicates that a message with specific parameters was successfully received by the corresponding subscriber, then the self-learning cloud broker 202 can update the count of successes corresponding to that subscriber and the specific parameters. For example, for message(s) 2 230 sent to Subscriber 2 212 with parameters 232 specifying a batch count of 4, a payload size of 256 bytes, and a time gap of 100 ms, if Subscriber 2 212 successfully receives the message(s) 2 230 then Subscriber 2 212 can send the response 250 to self-learning cloud broker 202. If the response 250 is received by self-learning cloud broker 202 within a threshold time, then the delivery is a success and self-learning cloud broker 202 can update the distribution 204 by updating the success count corresponding to Subscriber 2 212 (e.g., s=2), batch count of 4, payload size of 256 bytes, and time gap of 100 ms. Similarly, if the response 250 indicates that a message with specific parameters was not successfully received by the corresponding subscriber, then the self-learning cloud broker 202 can update the count of failures corresponding to that subscriber and the specific parameters.

In some embodiments, after initializing the distribution 204, the self-learning cloud broker 202 can operate to update the distribution 204 for an initial self-learning period. For example, the self-learning cloud broker 202 can be configured to select a fixed time gap from the available time gaps and then deliver event information as messages for a predetermined number of events (e.g., 5,000 events). With the time gap fixed, the self-learning cloud broker 202 can update the distribution 204 based on determination of optimal batch counts and payload sizes for the s subscribers for the predetermined number of events. Once the predetermined number of events has been handled, the self-learning cloud broker 202 can select the next fixed time gap from the available time gaps and repeat the initial update of the batch count and payload sizes for the predetermined number of events. For example, the available time gaps may include time gap values from 100 ms to 1 s at 100 ms intervals, so that the available time gaps are 100 ms, 200 ms, 300 ms . . . 1 s. If the predetermined number of events for this initial period is 5,000 events, then the self-learning cloud broker 202 can select a time gap of 100 ms, handle 5,000 events by determining payload size and batch count parameters and delivering corresponding messages to subscribers, update the distribution 204 based on the responses from the subscribers, then select a time gap of 200 ms, handle another 5,000 events, and repeating until the distribution has been updated for each of the available time gap values. In this example, the self-learning cloud broker 202 will have handled 50,000 events to update the distribution 204 according to the response characteristics of individual subscribers at various parameters. After the completion of the initial period, the self-learning cloud broker 202 can be configured to determine the time gap based on optimal values of the parameters as described above.

In some embodiments, due to the relationship between batch count and payload size, the self-learning cloud broker 202 can be configured to adjust the batch count and payload size from initially determined "optimal" values to ensure that the probability of a successful delivery of the batch of messages is greater than 50%. If the payload for an event exceeds the optimal payload size for each message in a batch, then the self-learning cloud broker 202 can split the payload the batch count by reducing or increasing the batch count by a factor. For example, if the initial batch count is 20 with an optimal payload size of 1 megabyte but with an event payload 60 MB, the self-learning cloud broker 202 can determine that the probability of successfully delivering the batch of 20 messages with payload of 3 MB to the corresponding subscriber is less than 50%. Based on this determination, the self-learning cloud broker 202 can split the batch in half (or other factor) and determine the probability of sending a batch of 10 messages with payload of 3 MB has probability greater than 50% for a successful delivery. If so, the batch can be sent (followed by a second batch to account for the remaining event data). If not, the split can be repeated until a suitable batch count is chosen for the payload size or the split batch count reduces to 1. Additional details about batch splitting by the self-learning cloud broker 202 are provided below with respect to FIG. 5.

FIG. 3 is an example array 300 encoding reward values $R[a_s^{(b)}, a_t^{(p)}]$ characterizing a distribution that can be sampled to determine a predicted success probability for a self-learning cloud broker (e.g., self-learning cloud broker 202 of FIG. 2) to deliver one or more messages to a subscribing client, according to some embodiments.

As discussed above, the implementation of Thompson sampling for a number S of Bernoulli bandits representing individual subscribers of a Pub-Sub messaging system can sample a distribution (e.g., the Beta distribution) representing the probability of success for each bandit (e.g., the probability of successfully delivering a message to a subscriber). For the Beta distribution, the probability can be given from the associated probability density function of the distribution, and in particular the mean of the distribution. Each entry $R[a_s^{(b)}, a_t^{(p)}]$ in the array can be encoded with four indices: "s" corresponding to a specific subscriber within the Pub-Sub messaging system; "t" corresponding to an available choice of time gap between successive messages or batch of messages; "b" corresponding to an available choice of batch count; and "p" corresponding to an available choice of payload size. For example, for S subscribers, the value of the index "s" can take on values from 1 to S. The entries $R[a_s^{(b)}, a_t^{(p)}]$ in array 300 each have two elements. The first element corresponds to the number of successes for the delivery of a message having the parameters indicated by the indices "s," "t," "b," and "p." The second element corresponds to the number of failures for the delivery of a message having the same parameters indicated by the indices.

The array 300 may be initialized such that each entry $R[a_s^{(b)}, a_t^{(p)}]$ is set to [1,1] prior to the operation of the self-learning cloud broker. As responses are received from subscribers indicating the success or failure of delivered messages, the self-learning cloud broker can update the entries for the corresponding indices. For example, for subscriber s=2 having messages delivered with parameters corresponding to b=16 (e.g., batch count 16), t=3 (e.g., time gap 300 ms), and p=4 (e.g., payload size 256 bytes), if the subscriber sends a response indicating a success, the self-learning cloud broker can update the corresponding entry $R[a_2^{(16)}, a_3^{(4)}]$ of array 300 so that the success element is incremented by 1, $R[a_2^{(16)}, a_3^{(4)}]+1$. A similar incrementing of the element corresponding to the number of failures for the corresponding indices can occur if the response indicates a failure.

Figure 4:
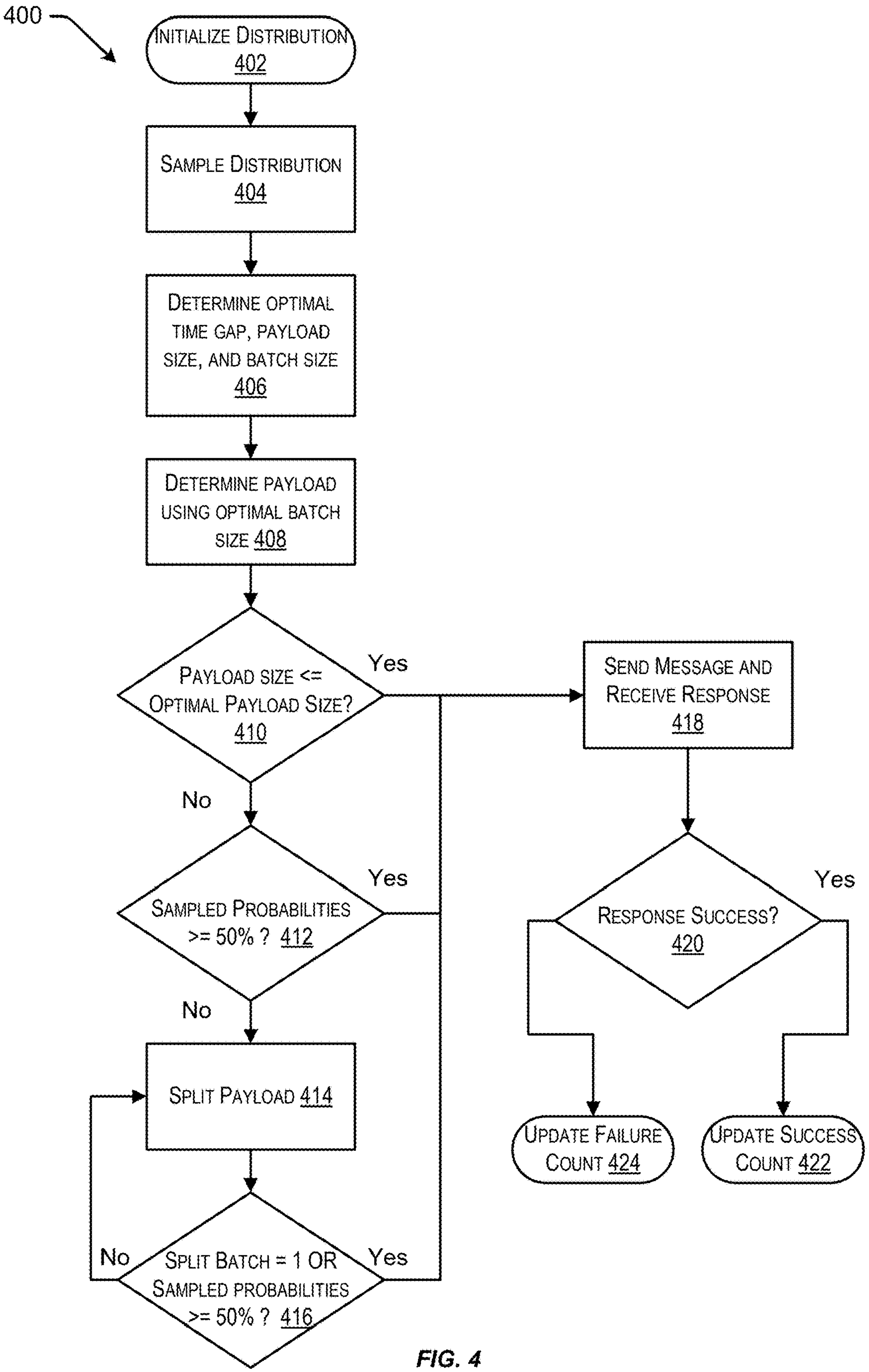
FIG. 4 is a flow diagram of an example process for determining message parameters by sampling from a distribution, according to some embodiments.

FIG. 4 is a flow diagram of an example process 400 for determining message parameters by sampling from a distribution, according to some embodiments. The process 400 may be performed by one or more components of a distributed computing system, including a self-learning cloud broker (e.g., self-learning cloud broker 202 of FIG. 2) executing in a computing environment (e.g., computing environment 200 of FIG. 2), including a cloud computing environment. In some embodiments, a computer-readable medium comprising computer-readable instructions that, upon execution by one or more processors of a distributed computing system, can cause the distributed computing system to perform the process 400. The operations of process 400 may be performed in any suitable order, and process 400 may include more or fewer operations than those depicted in FIG. 4.

Some or all of the process 400 (or any other processes and/or methods described herein, including process 500 and process 600, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 400 can begin at start point 402, with the self-learning cloud broker initializing the distribution (e.g., distribution 204 of FIG. 2). Prior to the first operation of the Pub-Sub messaging system using the self-learning cloud broker, the distribution can be initialized with each success count and failure count for each available value of the parameters set to "1," so that a priori the probability of a successful delivery of a message is 50% for every available combination of parameters. In some examples, the self-learning cloud broker can also initialize maximum parameter values. For example, a maximum batch count, maximum payload size, and maximum time gap value can be set based on predetermined values. In addition, for embodiments in which the available values are discrete, an interval size for the parameters can be set. For example, the time gap interval can be initially set to 100 ms, while the payload size interval can be initially set to 64 bytes. In some embodiments, after initializing the distribution, the self-learning cloud broker can operate to update the distribution for an initial self-learning period.

At block 404, the self-learning cloud broker can sample the distribution. As described above, the self-learning cloud broker can determine parameters for which a probability of success for delivering one or more messages to a subscriber is maximized based on a distribution representing the probability. For example, the distribution may be the Beta distribution having two input parameters corresponding to the number of successes and failures for messages delivered with specific message parameters. Sampling the distribution can include the self-learning cloud broker computing the mean based on the success and failure values stored in an array (e.g., array 300 of FIG. 3) that characterizes the distribution for each specific subscriber and each specific value of the available parameter values.

At block 406, the self-learning cloud broker can determine an optimal time gap value, an optimal payload size, and an optimal batch count using the values computed from sampling the distribution. For example, the self-learning cloud broker can determine a value for the batch count and payload size that provides a maximum probability that a message (or messages in a batch) will be successfully delivered to a subscriber, and simultaneously determine a time gap value that is minimal while still satisfying the maximum probability determined for the payload size and batch count.

At block 408, the self-learning cloud broker can determine the payload size of the messages based on the optimal batch count. The payload size for the one or more messages can depend on the amount of event data for the event (e.g., event 208 of FIG. 2), which may differ from the optimal payload size determined by the self-learning cloud broker at block 406. For example, the event data may be 60 MB and the batch count may be 20, so that the payload size for each message in the batch is 3 MB.

At decision 410, the self-learning cloud broker can determine if the payload size determined in block 408 is less than or equal to the optimal payload size determined in block 406. If the payload size is less than or equal to the optimal payload size, then the self-learning cloud broker can proceed to block 418 and send the messages to the corresponding subscriber. If the payload size is greater than the optimal payload size, the self-learning cloud broker can proceed to decision 412 and determine if the sampled probabilities are greater than or equal to 50%. Computing the sampled probabilities for decision 412 can use the payload size determined at block 408 but the optimal time gap and batch count determined at block 406. For this payload size (which exceeds the determined optimal payload size), if the probability of successfully sending the corresponding batch of messages is at least 50%, then the self-learning cloud broker can also proceed to block 418 and send the corresponding batch of messages to the subscriber. If the probability of successfully sending the corresponding batch of messages is less than 50% (e.g., the large payload size per message is too large to be reliably successful), the self-learning cloud broker can proceed to block 414 to split the payload.

At block 414, the self-learning cloud broker can split the payload. The batch count can be reduced by a factor while maintain the payload size as determined in block 408. The self-learning cloud broker can then sample the distribution again using the new, split batch count and the payload size to determine the probability of successfully delivering the split batch of messages. At decision 416, if the probability of successfully delivering the split batch of messages is at least 50%, the self-learning cloud broker can send the split batch of messages (at block 418) as well as send a second split batch of messages containing the remaining event data with payload. Decision 416 also checks whether the split batch count equals 1. If so, then regardless of the probability of successfully delivering the split batch of messages, the self-learning cloud broker will proceed to block 418 and send the messages to the subscriber (since a batch count of one is the minimum size available). If the result of decision 416 is that the split batch count is greater than one and the probability of successfully delivering the split batch of messages is less than 50%, the splitting process will be repeated. A specific example of the splitting process is described below with respect to process 500 of FIG. 5.

At block 418, the self-learning cloud broker can send the messages to the subscriber. The messages can be characterized by the parameters determined in blocks 406, 408, and 414. The self-learning cloud broker can generate the messages according to any suitable messaging format, including REST, RPC, and the like. The payload for each message can be determined from the event information. For example, the event information can be used to generate the payload by dividing portions of the event information for each message. At block 418, the self-learning cloud broker can also receive responses from the subscriber. The response can indicate a success or failure of the delivery of the messages. For example, the subscriber can send an "ACK" response within a threshold period of time, indicating a successful delivery of the message to the subscriber. In some examples, the response can explicitly indicate success (e.g., via an "ACK") or failure (e.g., a delivery failed indication due to a corrupted or unreadable message received by the subscriber). In other examples, if the response is received after the threshold period of time, the self-learning cloud broker can consider the message delivery a failure even if the subscriber successfully received the message.

At decision 420, the self-learning cloud broker can analyze the response according to the success/failure criteria described with respect to block 418 and determine if the delivery of the messages was a success. If a success, the self-learning cloud broker can update the success count for the corresponding parameters (e.g., time gap, payload size, batch count) and specific subscriber, at endpoint 422. If a failure, the self-learning cloud broker can update the failure count for the corresponding parameters and specific subscriber, at endpoint 424. Updating the success count and failure count can include incrementing the count by one.

The above description of process 400 may be performed for each subscriber from S total subscribers. For example, the self-learning cloud broker can perform process 400 for each of S subscribers that should receive the event information (e.g., subscribers that have subscribed to a corresponding topic related to the triggering event). The operations of process 400 may be parallelized to increase computational efficiency when determining the message parameters for each of the S subscribers.

Figure 5:
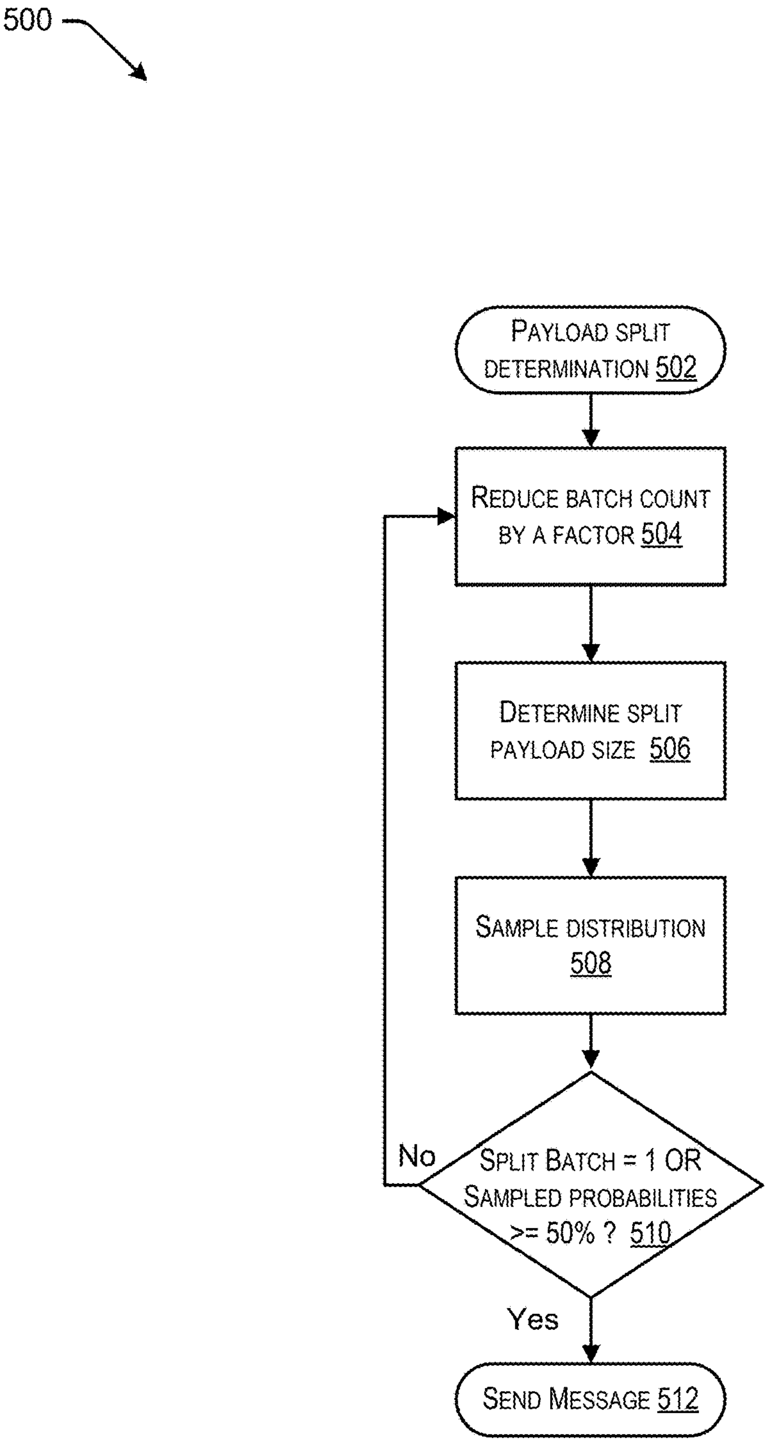
FIG. 5 is a flow diagram of an example process for splitting a batch of messages, according to some embodiments.

FIG. 5 is a flow diagram of an example process 500 for splitting a batch of messages, according to some embodiments. The process 500 can be performed by any of the self-learning cloud brokers described herein, including self-learning cloud broker 202 of FIG. 2, the self-learning cloud broker executing in a computing environment (e.g., computing environment 200 of FIG. 2), including a cloud computing environment. In some embodiments, a computer-readable medium comprising computer-readable instructions that, upon execution by one or more processors of a distributed computing system, can cause the distributed computing system to perform the process 500. The operations of process 500 may be performed in any suitable order, and process 500 may include more or fewer operations than those depicted in FIG. 5. The operations of process 500 may be a portion of the operations described above with respect to block 414 and decision 416 of process 400.

At start point 502, the self-learning cloud broker can determine that splitting the payload (e.g., splitting the batch) is appropriate for the messages to be sent. The determination to split the payload can be done as described above with respect to decisions 410 and 412 of FIG. 4.

At block 504, the self-learning cloud broker can reduce the batch count by a factor to produce a split batch count. The factor can be any suitable value that results in an integer split batch count. For example, the factor can be two so that the split batch count is one half the batch count. Other values for the factor can be three, four, ten, and the like. As a particular example, the batch count may initially be 20 as determined by the self-learning cloud broker based on the optimal batch count and payload size. The initial, optimal payload size may be 1 MB. However, the event data may be 60 MB, so that a batch of 20 messages will each have 3 MB payloads. Because the 3 MB payload exceeds the optimal 1 MB payload for a 20 message batch (and if the probability of successfully sending 20, 3 MB messages is less than 50%), then reducing the batch count by a factor can result in a batch that is more likely to be successful for the 3 MB payload size. As an illustrative example, the batch count of 20 can be reduced by half to produce a split batch count of 10.

At block 506, the self-learning cloud broker can determine the split payload size. The split payload size may be the same payload size per message as for the initial batch count. For example, the split payload size may be 3 MB, so that the sum of the payloads for the split batch count of 10 may be 30 MB (e.g., half of the total event payload). In some embodiments, the payload of each message in a batch may differ based on the how the payload data is structured for delivery of the event information to the subscriber. In these cases, the split payload size can be the sum of the payloads for the first 10 messages of the original 20 message batch.

At block 508, the self-learning cloud broker can sample the distribution using the split batch count and the split payload size. For example, the self-learning cloud broker can determine the probability of successfully delivering a batch of 10 messages each having 3 MB payloads. At decision 510, if the probability of successfully delivering the split batch of messages is at least 50%, or if the split batch count is equal to one (e.g., the minimum batch count), the self-learning cloud broker can send the messages to the subscriber (block 512). If the probability of successfully delivering the split batch of messages is less than 50%, the self-learning cloud broker can return to block 504 and repeat the batch split operations. For example, if a batch of 10 messages with 3 MB payloads is unlikely to be successfully delivered, the split batch count of 10 can be reduced in half again to 5. The self-learning cloud broker can then sample the distribution to determine the probability of successfully delivering a batch of 5 messages with 3 MB payloads.

As described above, batch splitting can result in reduced batch counts so that not all of the event information is transmitted to the subscriber in one reduced batch. Once the self-learning cloud broker has determined an acceptable split batch count, additional batches having the same split batch count can be generated having payloads with the remaining event information.

Figure 6:
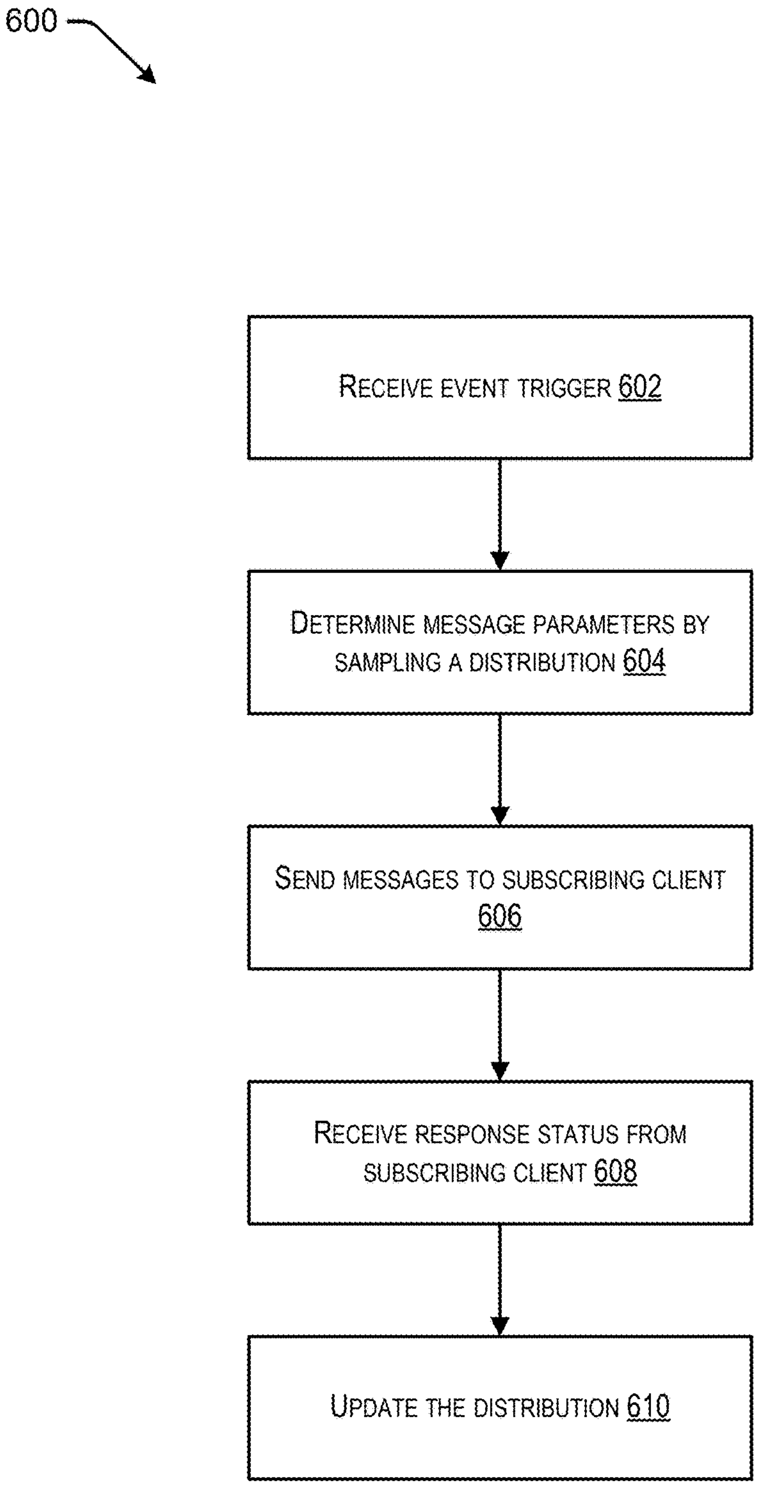
FIG. 6 is a flow diagram of another example process for determining message parameters by sampling from a distribution and updating the distribution, according to some embodiments.

FIG. 6 is a flow diagram of another example process 600 for determining message parameters (e.g., parameters 222-242 of FIG. 2) by sampling from a distribution (e.g., distribution 204 of FIG. 2) and updating the distribution, according to some embodiments. The process 600 can be performed by a message broker service, which can be an example of the self-learning cloud brokers described herein, including self-learning cloud broker 202 of FIG. 2, the self-learning cloud broker executing in a computing environment (e.g., computing environment 200 of FIG. 2), including a cloud computing environment. In some embodiments, a computer-readable medium comprising computer-readable instructions that, upon execution by one or more processors of a distributed computing system, can cause the distributed computing system to perform the process 600. The operations of process 600 may be performed in any suitable order, and process 600 may include more or fewer operations than those depicted in FIG. 6.

Process 600 may begin at block 602 with the message broker service receiving an event trigger. The even trigger can be an event (e.g., event 208 of FIG. 2) published by a publisher in a Pub-Sub messaging system (e.g., event source 206 of FIG. 2, Publisher N 106 of FIG. 1). The event trigger can include information usable to identify a subscribing client (e.g., Subscriber S 112 of FIG. 1) of a Pub-Sub messaging system. For example, the event trigger can include a topic identifying a subject of the event information published by the publisher. The message broker service can maintain (e.g., in a database) subscriptions from one or more subscribing clients that correspond with the topic, indicating that the one or more subscribing clients should receive messages corresponding to the even trigger.

At block 604, the message broker service can determine message parameters for one or more messages by sampling a distribution. Determining the message parameters can occur in response to the event trigger. The distribution can characterize a predicted response status of the subscribing client to the message. For example, the distribution can represent the probability that the corresponding one or more messages having the message parameters will be successfully delivered to the subscribing client. The predicted response status can then be whether the delivery will be a success or failure.

In some embodiments, the distribution can be the Beta distribution. As described above with respect to FIG. 2, the beta distribution Beta($\alpha$,$\beta$) can have two input parameters $\alpha$ and $\beta$. The parameters $\alpha$ and $\beta$ can represent the number of successes and failures, respectively, for prior messages sent to the subscribing client. Sampling the distribution can include Thompson sampling, in which the subscribing client (and each other subscribing client for which the message broker service mediates messages and determines message parameters) are treated as a Bernoulli bandit providing "rewards" (e.g., probability of successful message delivery) for each corresponding set of message parameters used to send the messages. By employing Thompson sampling, the message broker service can efficiently explore the reward space of independent Bernoulli bandits (e.g., separate subscribing clients) to maximize the expected total reward based on optimizing the message parameters.

In some embodiments, the message parameters can include a payload size, a batch count, or a time interval between successive messages to the subscribing client. The time interval may be referred to as a "time gap" described herein. The batch count can specify the number of messages to be sent in a "batch," a collection of individual messages sent successively by the message broker service to the subscribing client. (e.g., Subscriber 1 210). The payload size can specify the amount of data (e.g., in bytes) allocated for the event information in each message of the one or more messages. For example, each message may can have a payload size of 64 bytes, 256 bytes, or 1 megabyte, although many other values for payload size are suitable. The time interval can specify the length of time between the delivery of successive event messages. In some examples, the time gap may be 10 ms, 200 ms, 1 s, 5 s, any intervening value, or any other suitable value determined by the message broker service. In some examples, the time gap can specify the period of time between successive batches of messages.

At block 606, the message broker service can send the one or more messages to the subscribing client. The one or more messages can be characterized by the message parameters. For example, the one or more messages can have a batch count (e.g., 20 messages), a payload size (e.g., 1 MB), and a time interval (e.g., 100 ms). The one or more messages can constitute a batch of messages, wherein the number of messages of the one or more messages equals the batch count.

At block 608, after sending the messages, the message broker service can receive a response status from the subscribing client. The subscribing client can provide a response that includes the response status (e.g., success or failure). In some embodiments, the response status can correspond to receiving a response from the subscribing client within a threshold time period. For example, the message broker service can set a quality of service response time limit of 500 ms. If the subscribing client sends a response to the message broker service that is received within 500 ms of the message broker service sending the one or more messages to the subscribing client, the response status can be a success. If the subscribing client sends a response to the message broker service that is received after 500 ms of the message broker service sending the one or more messages to the subscribing client, the response status can be a failure (regardless of if the subscribing client received the one or more messages). In some embodiments, the response status can explicitly identify whether the delivery of the one or more messages was a success or a failure.

At block 610, the message broker service can update the distribution based on the response status. Updating the distribution can include updating a success count or a failure count associated with the subscribing client and the message parameters. If the response status indicates a success, the message broker service can update the success count for the corresponding parameters (e.g., time gap, payload size, batch count) and specific subscriber. The success count may be an element of an array (e.g., array 300 of FIG. 3) characterizing the distribution. If a failure, the message broker service can update the failure count for the corresponding parameters and specific subscriber. Updating the success count and failure count can include incrementing the count by one.

In some embodiments, the process 600 can also include the message broker service determining whether the payload size exceeds a threshold payload size. For example, if the message broker service determines an optimal payload size when determining the message parameters, the threshold payload size can be the optimal payload size. The payload size for the one or more messages can depend on the amount of event data (event information) contained in the event trigger that should be sent to the subscribing client. For the batch count, if the payload size of the one or more messages in the batch have a payload size that exceeds the optimal payload size, the message broker service can determine whether a probability obtained from sampling the distribution falls below a threshold probability. The probability can be associated with successfully delivering the one or more messages. For example, the threshold probability can be 50%, so that the message broker service can determine whether the payload size and the batch count will result in the one or more messages being successfully delivered with at least a 50% probability. If the message broker service determines that the probability falls below the threshold probability (e.g., is less than 50%), then the message broker service can reduce the batch count. For example, if the batch count is 20 and the payload size is 3 MB but the optimal (e.g., threshold) payload size is 1 MB, the message broker service can reduce the batch count by half to produce a split batch count of 10. The message broker service can then determine a split payload size and sample the distribution again to determine whether the probability of sending the split batch is likely to succeed. Specific examples of the batch split process are provided with respect to FIG. 5 above.

In some embodiments the message broker service can obtain a snapshot of the distribution corresponding to a prior time period. For example, the message broker service of a Pub-Sub messaging system may operate during a holiday season or other high message rate time period between the message broker service and the subscribing client in which the number of publishing clients, the number of subscribing clients, and the total number of events to be mediated are significantly increased over other time periods. The self-learning capabilities of the message broker service can allow the message broker service to adapt to these changes. However, time-period specific snapshots of the distribution (e.g., success counts and failure counts for existing subscribers) can be used to allow the message broker service to "pre-scale" its parameter determination at the beginning of a similar holiday time period. Prior to sampling from the distribution, the message broker service can initialize the distribution based at least in part on the snapshot. For example, the message broker service can update the success counts and failure counts for existing subscribers based on the holiday time period success counts and failure counts that were tracked during the prior holiday time period. Similarly, the message broker service can determine success counts and failure counts based on the prior time period snapshot for new subscribers. For example, the snapshot can be used to predict that new clients subscribing to the Pub-Sub messaging system during the holiday period are similar to existing subscribers, so that the initial distribution values for the new subscribers can be initialized to the same values as existing subscribers using the snapshot.

Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model may require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
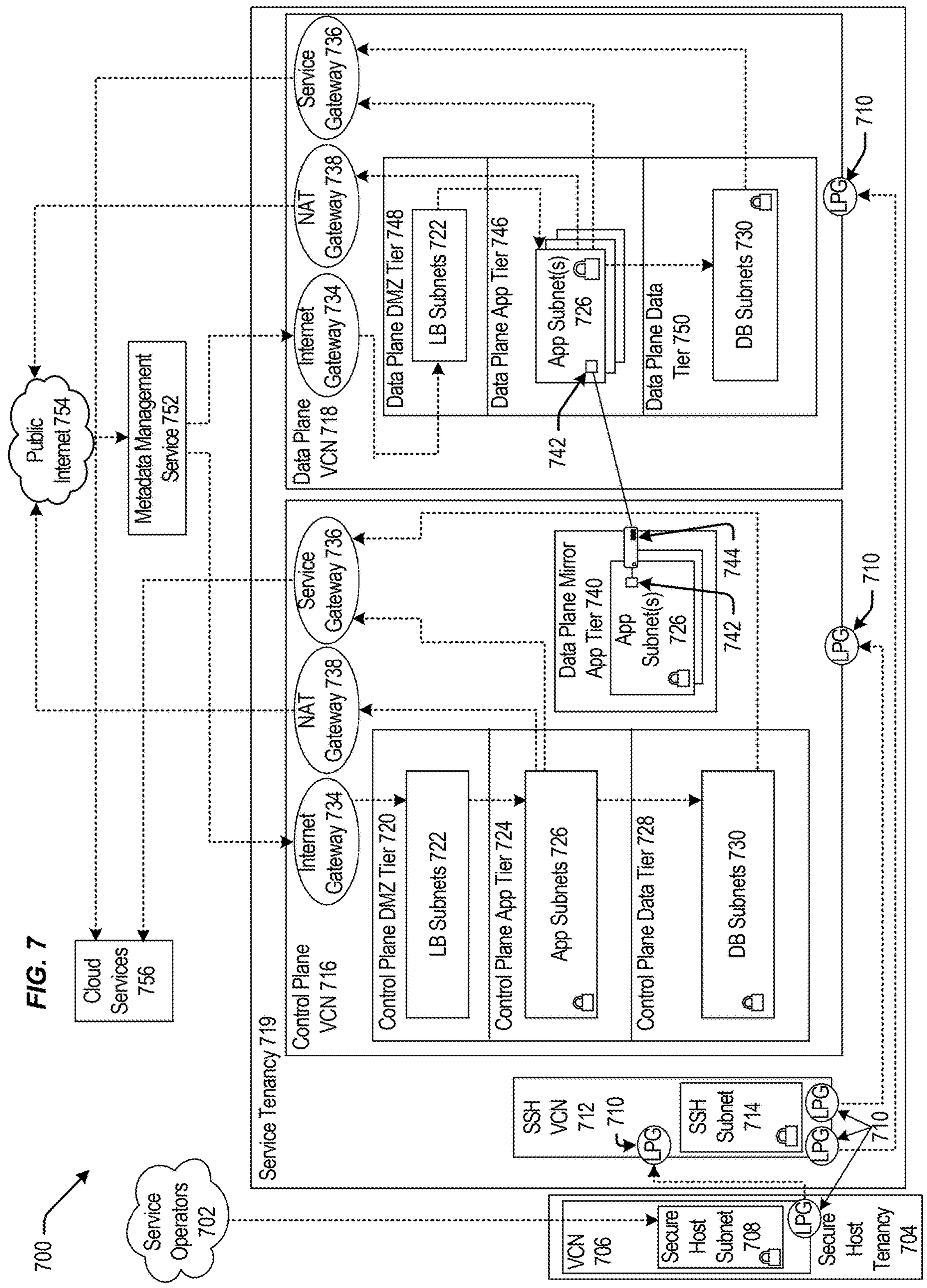
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively coupled to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
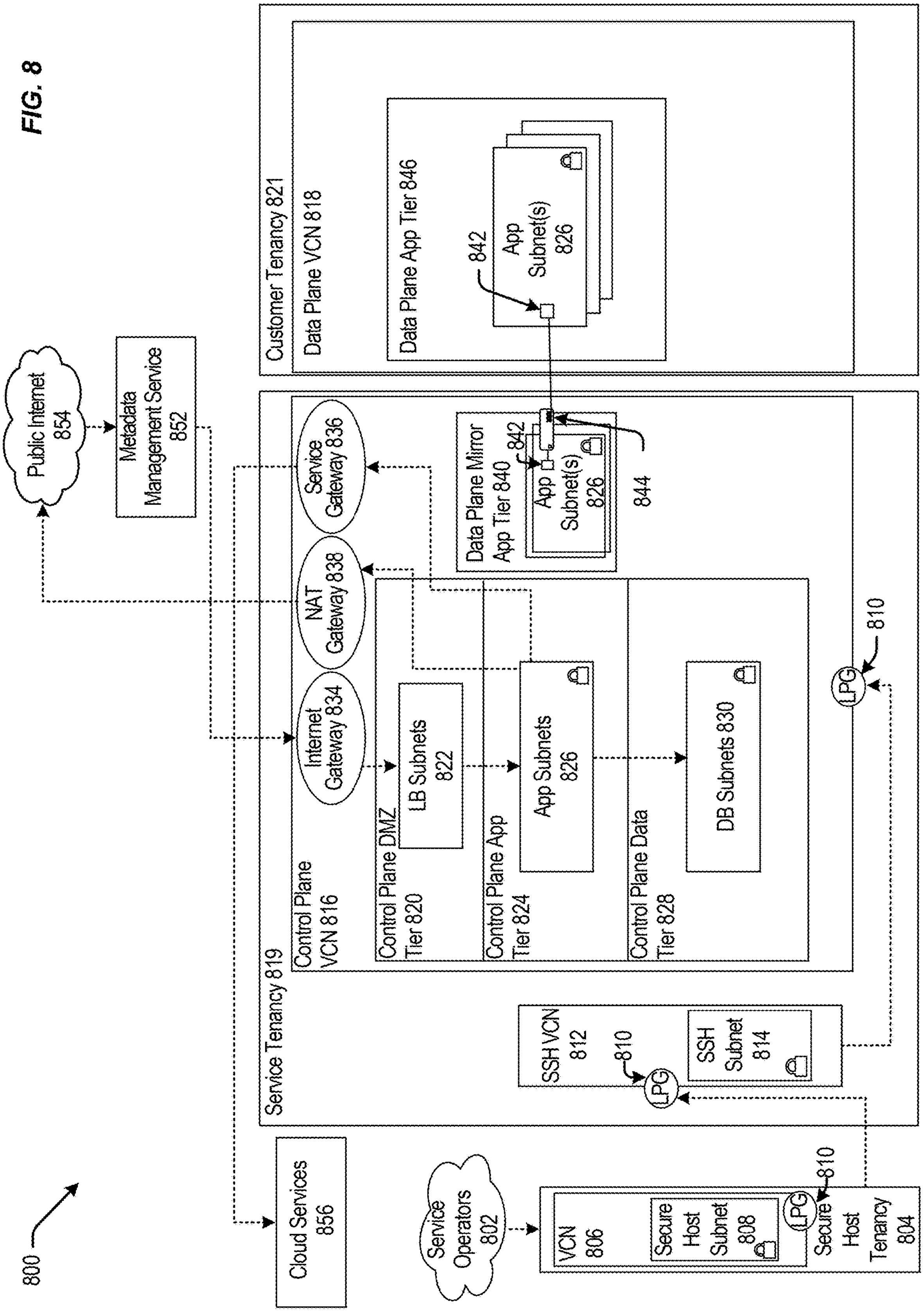
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively coupled to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
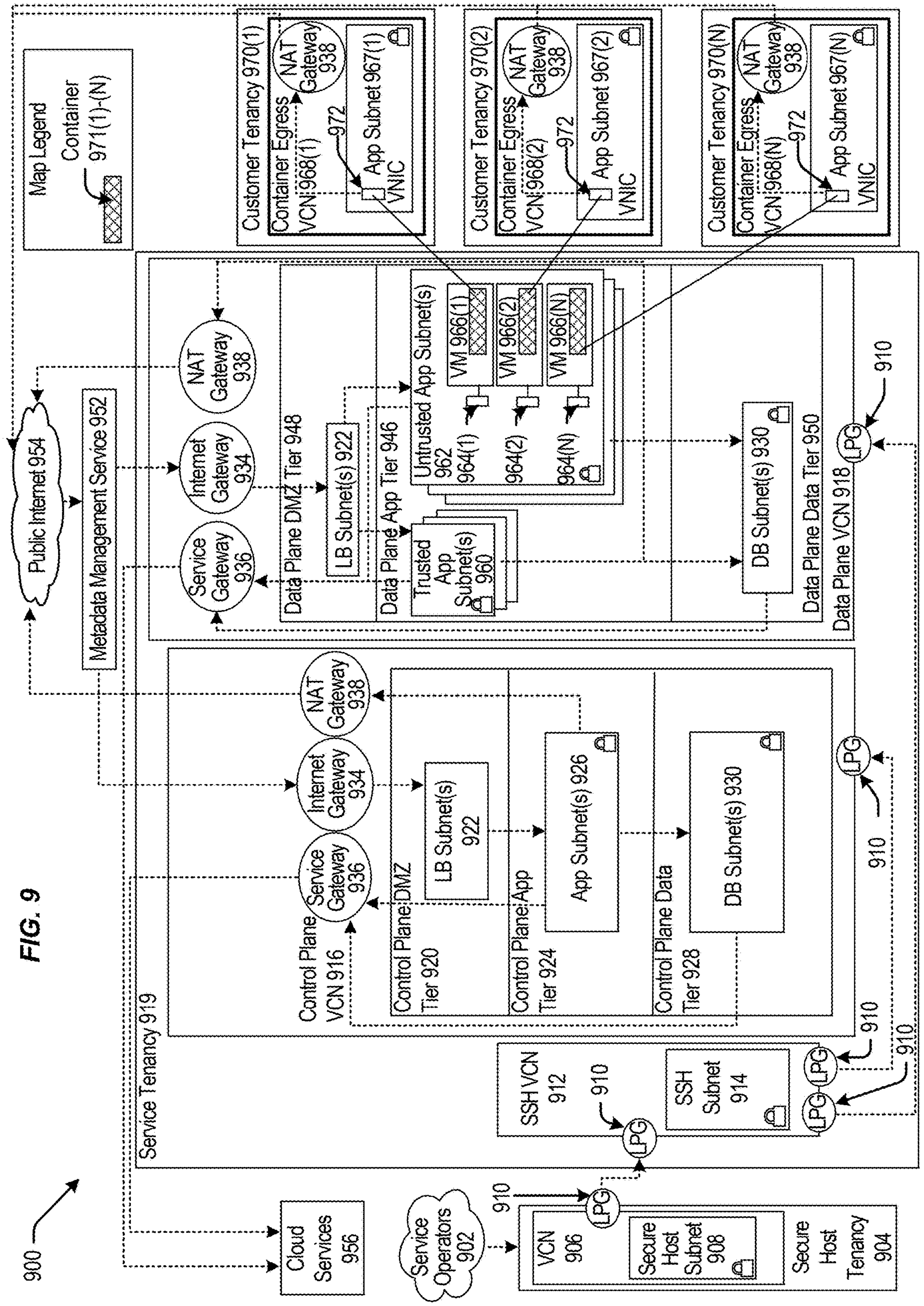
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively coupled to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
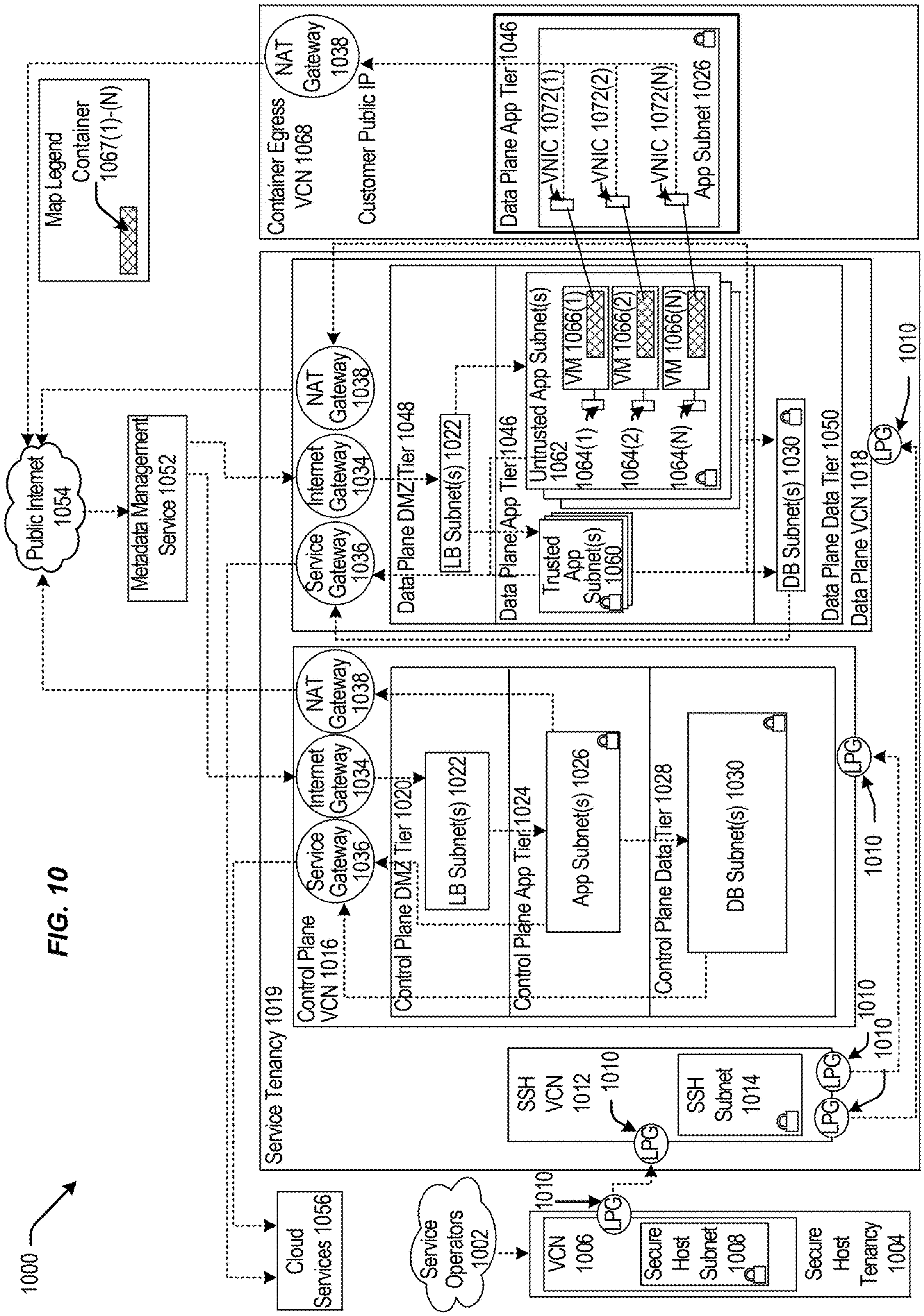
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
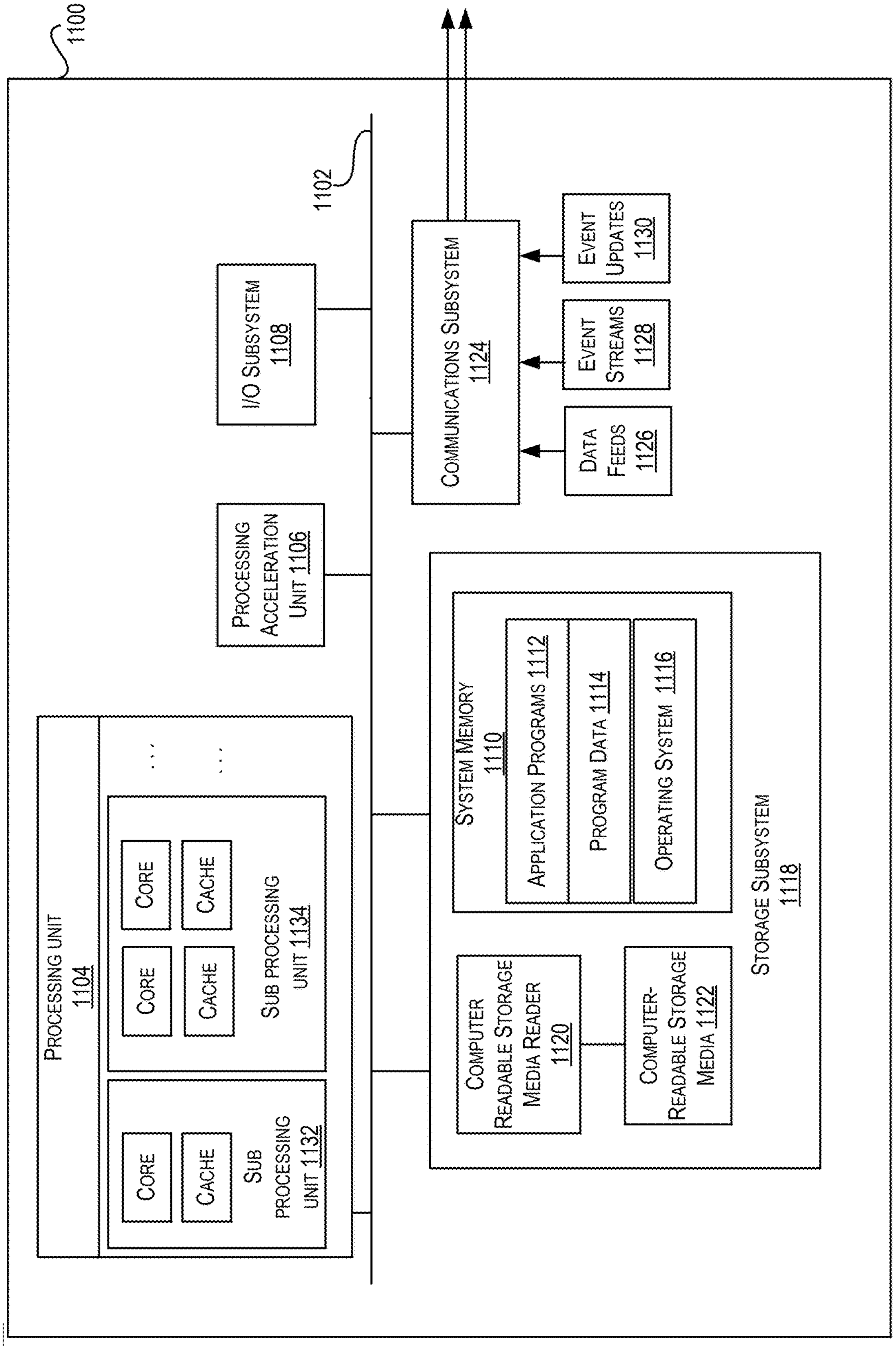
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1104 provide the functionality described above. Storage subsystem 1118 may also provide a repository for storing data used in accordance with the present disclosure.

As depicted in the example in FIG. 11, storage subsystem 1118 can include various components including a system memory 1110, computer-readable storage media 1122, and a computer readable storage media reader 1120. System memory 1110 may store program instructions that are loadable and executable by processing unit 1104. System memory 1110 may also store data that is used during the execution of the instructions and/or data that is generated during the execution of the program instructions. Various different kinds of programs may be loaded into system memory 1110 including but not limited to client applications, Web browsers, mid-tier applications, relational database management systems (RDBMS), virtual machines, containers, etc.

System memory 1110 may also store an operating system 1116. Examples of operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1100 executes one or more virtual machines, the virtual machines along with their guest operating systems (GOSs) may be loaded into system memory 1110 and executed by one or more processors or cores of processing unit 1104.

System memory 1110 can come in different configurations depending upon the type of computer system 1100. For example, system memory 1110 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1110 may include a basic input/output system (BIOS) containing basic routines that help to transfer information between elements within computer system 1100, such as during start-up.

Computer-readable storage media 1122 may represent remote, local, fixed, and/or removable storage devices plus storage media for temporarily and/or more permanently containing, storing, computer-readable information for use by computer system 1100 including instructions executable by processing unit 1104 of computer system 1100.

Computer-readable storage media 1122 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Machine-readable instructions executable by one or more processors or cores of processing unit 1104 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:

receiving, by a message broker service executing in a computing environment, an event trigger comprising information usable to identify a subscribing client of a publisher-subscriber messaging system;

responsive to the event trigger, determining, by the message broker service, message parameters for one or more messages by sampling a distribution, the distribution characterizing a predicted response status of the subscribing client to the message;

sending, by the message broker service, the one or more messages to the subscribing client, the one or more messages characterized by the message parameters;

receiving, by the message broker service, a response status from the subscribing client; and updating, by the message broker service, the distribution based on the response status.

2. The method of claim 1, wherein the message parameters comprise a payload size and a batch count, and wherein determining the message parameters further comprises:

determining, by the message broker service, whether the payload size exceeds a threshold payload size;

based at least in part on the payload size exceeding the threshold payload size, determining, by the message broker service, whether a probability obtained from sampling the distribution falls below a threshold probability, the probability associated with successfully delivering the one or more messages; and based at least in part on the probability falling below the threshold probability, reducing, by the message broker service, the batch count.

3. The method of claim 1, further comprising:

obtaining, by the message broker service, a snapshot of the distribution corresponding to a prior time period; and prior to sampling from the distribution, initializing the distribution based at least in part on the snapshot.

4. The method of claim 3, wherein the prior time period corresponds to a high message rate time period between the message broker service and the subscribing client.

5. The method of claim 1, wherein the distribution is a beta distribution.

6. The method of claim 1, wherein the response status indicates a successful receipt of the message by the subscribing client.

7. The method of claim 6, wherein the response status indicating the successful receipt of the message is received by the message broker service within a threshold response time.

8. The method of claim 1, wherein the response status indicates a failed receipt of the message by the subscribing client.

9. The method of claim 1, wherein the message parameters comprise a payload size, a batch count, or a time interval between successive messages to the subscribing client.

10. The method of claim 1, wherein sampling the distribution comprises Thompson sampling.

11. The method of claim 1, wherein updating the distribution comprises updating a success count or a failure count associated with the subscribing client and the message parameters.

12. A distributed computing system, comprising:

one or more processors; and one or more memories storing computer-executable instructions that, when executed by the one or more processors, cause the distributed computing system to:

receive, by a message broker service executing in the distributed computing system, an event trigger comprising information usable to identify a subscribing client of a publisher-subscriber messaging system;

responsive to the event trigger, determine, by the message broker service, message parameters for one or more messages by sampling a distribution, the distribution characterizing a predicted response status of the subscribing client to the message;

send, by the message broker service, the one or more messages to the subscribing client, the one or more messages characterized by the message parameters;

receive, by the message broker service, a response status from the subscribing client; and update, by the message broker service, the distribution based on the response status.

13. The distributed computing system of claim 12, wherein the message parameters comprise a payload size and a batch count, and wherein determining the message parameters further comprises:

determining, by the message broker service, whether the payload size exceeds a threshold payload size;

based at least in part on the payload size exceeding the threshold payload size, determining, by the message broker service, whether a probability obtained from sampling the distribution falls below a threshold probability, the probability associated with successfully delivering the one or more messages; and based at least in part on the probability falling below the threshold probability, reducing, by the message broker service, the batch count.

14. The distributed computing system of claim 12, wherein the one or more memories store further instructions that, when executed by the one or more processors, cause the distributed computing system to further:

obtain, by the message broker service, a snapshot of the distribution corresponding to a prior time period; and prior to sampling from the distribution, initialize the distribution based at least in part on the snapshot.

15. The distributed computing system of claim 14, wherein the prior time period corresponds to a high message rate time period between the message broker service and the subscribing client.

16. The distributed computing system of claim 12, wherein updating the distribution comprises updating a success count or a failure count associated with the subscribing client and the message parameters.

17. A non-transitory computer-readable medium comprising executable instructions that, when executed by one or more processors of a distributed computing system, cause the distributed computing system to:

receive, by a message broker service executing in the distributed computing system, an event trigger comprising information usable to identify a subscribing client of a publisher-subscriber messaging system;

responsive to the event trigger, determine, by the message broker service, message parameters for one or more messages by sampling a distribution, the distribution characterizing a predicted response status of the subscribing client to the message;

send, by the message broker service, the one or more messages to the subscribing client, the one or more messages characterized by the message parameters;

receive, by the message broker service, a response status from the subscribing client; and update, by the message broker service, the distribution based on the response status.

18. The non-transitory computer-readable medium of claim 17, wherein the message parameters comprise a payload size and a batch count, and wherein determining the message parameters further comprises:

determining, by the message broker service, whether the payload size exceeds a threshold payload size;

based at least in part on the payload size exceeding the threshold payload size, determining, by the message broker service, whether a probability obtained from sampling the distribution falls below a threshold probability, the probability associated with successfully delivering the one or more messages; and based at least in part on the probability falling below the threshold probability, reducing, by the message broker service, the batch count.

19. The non-transitory computer-readable medium of claim 17, comprising additional instructions that, when executed by the one or more processors, cause the distributed computing system to further:

obtain, by the message broker service, a snapshot of the distribution corresponding to a prior time period; and prior to sampling from the distribution, initialize the distribution based at least in part on the snapshot.

20. The non-transitory computer-readable medium of claim 19, wherein the prior time period corresponds to a high message rate time period between the message broker service and the subscribing client.

* * * * *